Figure 1:
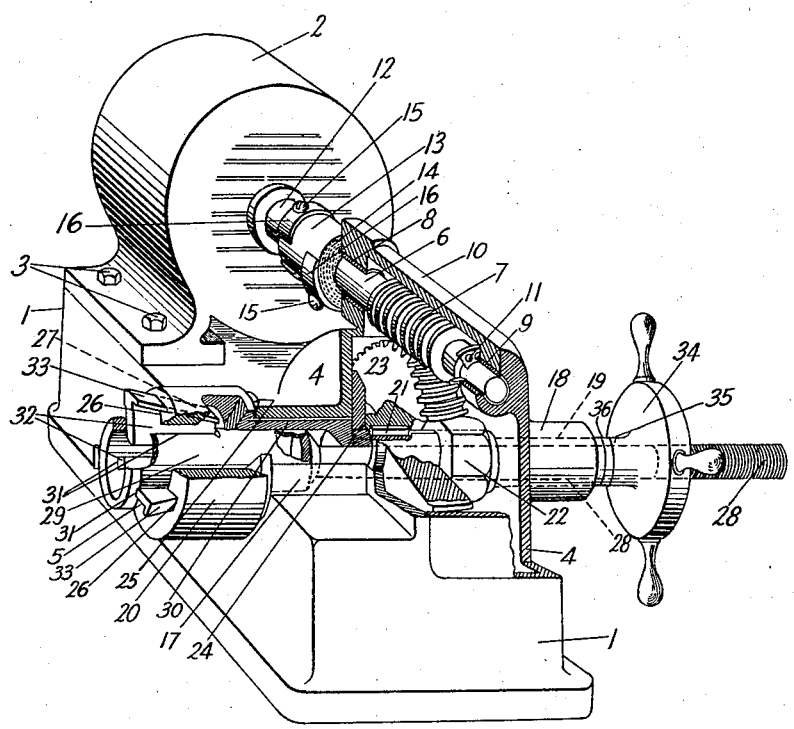

June 19, 1928.

F. A. LITTER 1,674,208

HOLDING AND TURNING APPARATUS

Filed Aug. 30, 1926

Frederick A. Litter
INVENTOR.

BY
ATTORNEY

Patented June 19, 1928.

1,674,208

UNITED STATES PATENT OFFICE.

FREDERICK A. LITTER, OF COLUMBUS, OHIO.

HOLDING AND TURNING APPARATUS.

Application filed August 30, 1926. Serial No. 132,643.

My invention relates to holding and turning apparatus and has to do particularly with the provision of a compact and portable power driven unit for holding and rotating a tool or piece of work removably held and centered within a novel adjustable chuck which is operatively connected through a reduction gearing to an electric motor mounted upon a common base with the other parts of the apparatus.

The primary object of my invention is the provision of a holding and turning apparatus embodying in one compact unit an electric motor, a reduction gearing and a chuck which is adjustable to center and hold pieces of work or tool shanks of different diameters.

This invention is particularly adapted to operations such, for example, as drilling, reaming, boring or the like which require too much power to be successfully completed by a device that is entirely operated by hand and yet are too small and simple to necessitate both the work and the tool being set up in a holding device.

A further object of my invention is the provision of a chuck consisting of a driven head member, tapered jaws coacting with inclined seats in said head member and a longitudinally reciprocable means connected to said jaws for adjusting the size of the receiving opening formed by said jaws.

Other objects of my invention will appear from the following detailed description and all features are illustrated in the accompanying drawing wherein the figure is a perspective view having parts broken away and parts in section to show the general arrangement of the various parts of my invention and in particular the driving mechanism and adjustable chuck.

In the drawings, an illustrative embodiment of my invention is shown as comprising a base structure 1 having an electric motor 2 removably attached to one end thereof by means of bolts 3. The base 1 preferably forms a lubricant container for the reduction gearing hereafter described. The opposite end of the base structure 1 forms a gear casing 4 for containing the bearings and gearing through which the electric motor 2 operates the chuck 5 in a manner to be presently described.

The driving mechanism for the chuck 5 preferably comprises a shaft 6 which is provided with a worm pinion 7. The shaft 6 may be journaled in suitable bearings 8 and 9 in opposite ends of a housing 10 forming a preferably removable part of the gear case 4. The shaft 6 is also preferably provided with a thrust bearing 11 and is connected to the shaft 12 of motor 2 by means of a coupling 13. The coupling 13 may comprise a flexible tube member 14 secured between the adjacent ends of the motor shaft 12 and the shaft 6 by bolts or the like 15 that extend through suitable openings in the tube 14 and shaft ends and bind against the oppositely arranged washers 16. Extending transversely of the gear case 4 and base structure 1 and journaled in suitable bearings 17 and 18 is a tubular shaft 19 which is preferably formed with a relatively large head 20. Secured to the shaft 19 by means of a key 21 and nut 22 cooperating with threads on the shaft 19 is a worm gear 23 which meshes with the worm pinion 7 carried by the shaft 6. The key 21, also, serves to secure in place a thrust plate 24 which together with a bearing 25 interposed between the head 20 and the bearing 17 prevents lengthwise movement of the shaft 19.

The enlarged head 20 of the shaft 19 may be formed with a plurality of preferably L-shaped slots or recesses 26 which have inclined inner faces 27 for a purpose to be later explained. Mounted within the shaft 19 and longitudinally reciprocable with reference thereto is a shaft 28. This shaft 28 may be formed with a somewhat larger socket portion 29 which fits within the similarly enlarged portion 30 of the shaft 19. If desired the shaft 28 may be made hollow throughout its length. The socket portion 29 of the shaft 28 is provided with a plurality of slots 31 which are adapted to receive the chuck jaw members 32. These members are preferably L-shaped in cross-section and are designed to fit within the similarly shaped slots or recesses 26 formed in the head 20. The jaw members 32 are also formed with inclined back faces 33 which have a bearing on the inner inclined faces 27 of the recesses 26.

The jaw members 32 of the chuck 5 may be moved toward or from the central axis of the socket 29 by suitably moving the shaft 28 lengthwise of the shaft 19 by means of a hand wheel 34 which has a boss portion 35 adapted to bear against the end 36 of the shaft 19 which projects slightly beyond the bearing 18. This arrangement prevents binding and insures an easy adjustability of the jaw members 32. It will be obvious that any longitudinal movement of the shaft 28 will be effective to cause the inclined faces 33 of the jaw members 32 to coact with the inclined faces 27 of the recesses 26 and so move such jaw members radially as may be necessary to adjust the chuck for receiving a particular sized tool shank or piece of work. When such piece of work or tool shank, as for instance the shank of a reamer, has been positioned within the socket portion 29 of the shaft 28, the hand wheel 34 may be revolved in the proper direction to center it and cause the jaw members 32 to tightly grip and hold it while being turned by the motor.

From the preceding description, it will be apparent that I have provided a compact and particularly simple holding and turning apparatus which can be cheaply manufactured and which is adapted to effectively perform its intended functions. It will furthermore, be apparent that I have produced an extremely simple, yet compact and positive chuck, which is adapted to securely hold pieces of work or tool shanks of a wide range of sizes.

Also, by referring to the preceding description, it will be seen that I have provided a device which is capable of a wide range of varying uses. For instance, a tool might be held and rotated in my device and the work held in proper position by hand, the work might be held and rotated in my device and the tool held by hand, or the work might be held and rotated in my device to facilitate grinding or polishing of the pieces of work.

Having thus described my invention, what I claim is:

1. A holding and turning apparatus comprising a base, a motor mounted upon said base, a worm pinion connected to said motor, a shaft having an enlarged portion at one end thereof and integrally formed therewith, a worm gear secured to the end of said shaft most remote from the enlarged portion of said shaft and intermeshed with said pinion, a second shaft having an enlarged portion at one end thereof and integrally formed therewith disposed within said first named shaft, and means for moving said second named shaft longitudinally relative to said first named shaft, the enlarged portion of the second named shaft forming a receiving opening for the work.

2. A holding and turning apparatus comprising a base, a motor mounted upon said base, a worm pinion connected to said motor, a transverse shaft having an enlarged portion at one end thereof, and integrally formed therewith, a worm gear secured to the end of said shaft most remote from the enlarged portion of the said shaft and intermeshed with said pinion, a second named shaft having an enlarged portion at one end thereof and integrally formed therewith disposed within said first named shaft, means for moving said second named shaft longitudinally relative to said first named shaft, the enlarged portion of the second named shaft forming a receiving opening for the work or tool, and means for preventing longitudinal movement of said first named shaft.

In testimony whereof I hereby affix my signature.

FREDERICK A. LITTER